United States Patent
Pitla et al.

(10) Patent No.: US 6,760,329 B1
(45) Date of Patent: Jul. 6, 2004

(54) METHOD AND SYSTEM FOR HANDLING PROPRIETARY PROTOCOLS AND TRANSMISSION CONTROL PROTOCOL/ INTERNET PROTOCOL (TCP/IP) OVER A POINT-TO-POINT (PPP) CONNECTION

(75) Inventors: Rao S. Pitla, Beaverton, OR (US); Roy Kenneth Larsen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,548

(22) Filed: Mar. 31, 2000

(51) Int. Cl.$^7$ ................................................ H04L 12/28
(52) U.S. Cl. ........................ 370/389; 370/469; 709/227; 709/230; 709/250
(58) Field of Search ...................... 370/395.5, 465–467, 370/389, 469; 709/203, 227, 230, 250; 379/88.17

(56) References Cited

U.S. PATENT DOCUMENTS

| | | | | |
|---|---|---|---|---|
| 5,674,003 A | * | 10/1997 | Andersen et al. | 709/228 |
| 6,125,177 A | * | 9/2000 | Whittaker | 379/243 |
| 6,269,402 B1 | * | 7/2001 | Lin et al. | 709/227 |
| 6,560,239 B1 | * | 5/2003 | Frid et al. | 370/426 |
| 2002/0010818 A1 | * | 1/2002 | Wei et al. | 710/62 |

* cited by examiner

Primary Examiner—Hassan Kizou
Assistant Examiner—Christopher M Swickhamer
(74) Attorney, Agent, or Firm—Kenyon & Kenyon

(57) ABSTRACT

A method and system for handling both proprietary and transmission control protocol/internet protocol (TCP/IP) protocols over a point-to-point protocol (PPP) connection. The method and system use the PPP connection over a single communication line to initially communicate using a proprietary protocol and then switch to a TCP/IP communication while still maintaining the connection to the single communication line.

29 Claims, 3 Drawing Sheets

METHOD AND SYSTEM FOR HANDLING PROPRIETARY PROTOCOLS AND TRANSMISSION CONTROL PROTOCOL/ INTERNET PROTOCOL (TCP/IP) OVER A POINT-TO-POINT (PPP) CONNECTION

FIELD OF THE INVENTION

The present invention relates to a method and system for handling both proprietary and transmission control protocol/internet protocol (TCP/IP) protocols over a single point-to-point protocol (PPP) connection.

Background

Currently, a point-to-point protocol (PPP) connection over a dial-up line can operate with, for example, a transmission control protocol/internet protocol (TCP/IP), an International Business Machines (IBM®) Network Basic Input/Output System (NetBIOS) Extended User interface (NetBEUI) Application Programming Interface (API) and Novell® Internetwork Packet Exchange™–Sequenced Packet Exchange™ (IPX™–SPX™) compatible protocols. However, the PPP connection does not support and, thus, can not be used for proprietary protocol-based communications. The PPP is defined in Internet Standards Track protocol RFC1549, Internet Official Protocol Standards, RFC1549—The Point-to-Point Protocol (PPP) Specification, published July 1994. The NetBEUI API is implemented in the IBM® LAN Manager program available from IBM Corporation of Armonk, N.Y. The IPX™ and SPX™ protocols are implemented in the Novell® NetWare® network operating system available from Novell, Inc., of Provo, Utah. The TCP is defined in Internet Standards Track protocol RFC793, Internet Official Protocol Standards, RFC793—Transmission Control Protocol DARPA Internet Program Protocol Specification, published September 1981. The IP is defined in Internet Standards Track protocol RFC791, Internet Official Protocol Standards, RFC791—Internet Protocol DARPA Internet Program Protocol Specification, published September 1981. In certain cases, for example, management of remote computers, there is a need for users, or more accurately remote management application programs, to communicate initially using proprietary protocols and then switch over to a TCP/IP, NetBEUI or IPX™–SPX™ type of connection for further operations while still maintaining the connection. Since PPP does not permit the use of proprietary protocols, the initial connection must first be a non-PPP connection, which is made using the proprietary protocol, a modem and a communication line. To switch to TCP/IP, the initial non-PPP connection must be dropped and the line connection initiated again using a PPP, for example, a Remote Access Service (RAS) which is provided in the Windows® 95 and above operating system (OS) versions. The Windows® OS is licensed by Microsoft Corporation of Redmond, Wash. The RAS enables a user to log on to a network via a dial-up connection and operate as if the user was physically connected to the network. This capability permits the diagnosis and correction of system problems from remote computers. In many operating environments dropping and re-dialing in an attempt to reconnect to the same line used for the non-PPP connection is not feasible, since the re-dial is not guaranteed to be able to successfully reconnect to the same line as was used for the non-PPP connection. Reconnecting to the same line can not be guaranteed since the server with which the non-PPP connection was made does not maintain any modem connection status information in order to enable the new call to be recognized as being related to the prior non-PPP call. In such situations, in order to operate in other protocols, the RAS needs to be blocked initially and the communication handle of the line must be obtained. To accomplish this, a special driver is required which can expose the communication handle at the application level. Unfortunately, due to differences across multiple platforms, a separate special driver is required for each type of platform.

While current systems permit users to connect over dial-up lines using either a PPP connection or a non-PPP connection, there are no systems that enable users to use a PPP connection to initially communicate using a non-PPP protocol and then switch to a TCP/IP, or similar protocol, [-] based PPP connection over a single communication line without first dropping the PPP connection and attempting to reconnect to the same communication line and without the use of special drivers.

Therefore, a universal method and system are needed that will enable users to use a PPP connection to communicate over a single communication line initially using a non-PPP protocol and then switch to a TCP/IP or similar protocol while still maintaining the PPP connection without the use of special drivers for different platforms.

DETAILED DESCRIPTION

Figure 1:
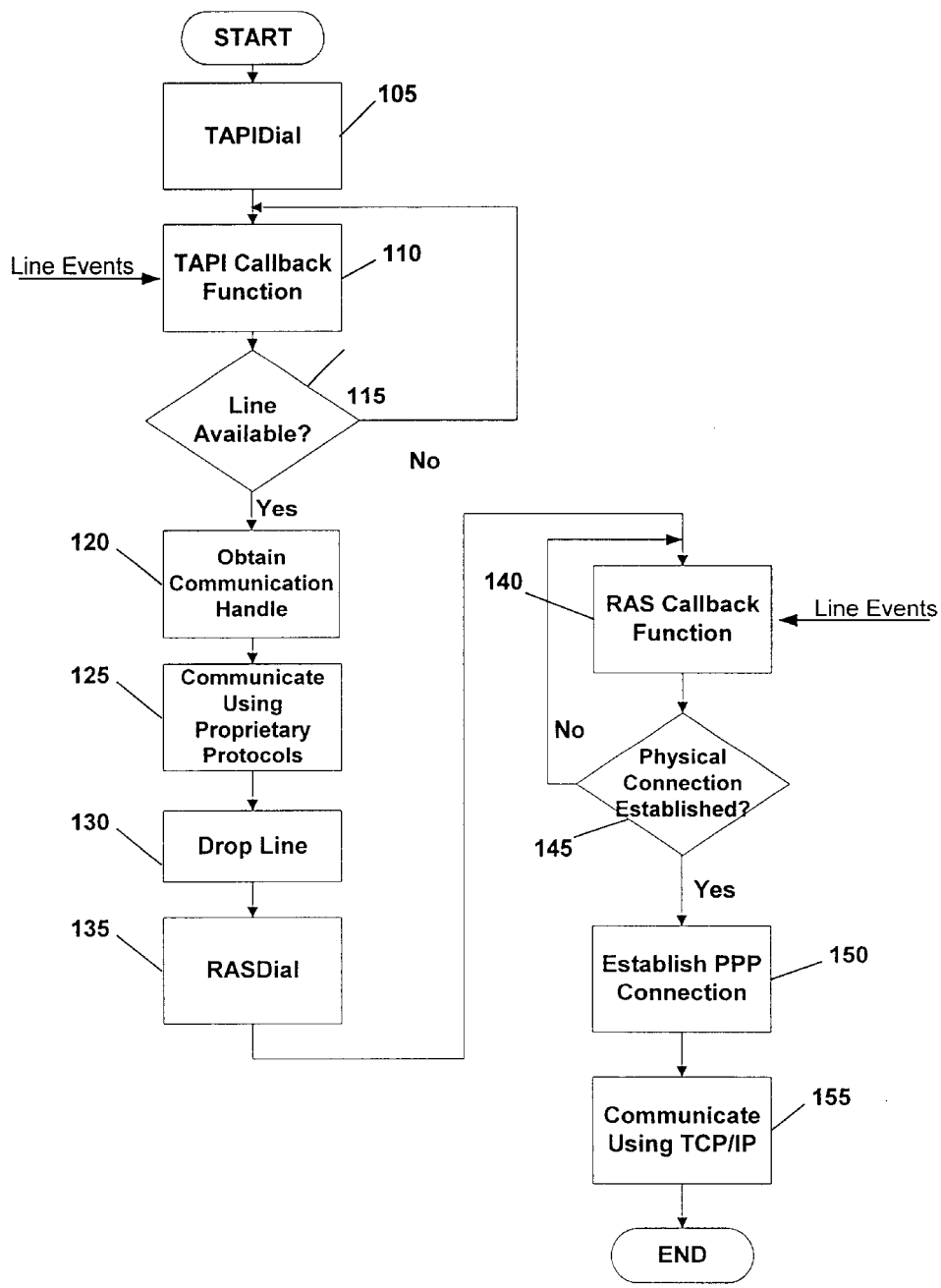
FIG. 1 illustrates a top-level functional diagram of an existing dial-up communication method which is used to communicate initially using a proprietary protocol over a communication line using a non-PPP connection, dropping the non-PPP connection and then attempting to communicating over the same communication line using a PPP connection.

In embodiments of the present invention, an application program uses a PPP communication over a single communication line to initially communicate using a proprietary protocol and then switch to a TCP/IP communication while still maintaining the connection to the single communication line. This enables a client application to communicate with a remote server via a single dial-up connection to extract system parameters using proprietary communication protocols. In addition, since embodiments of the present invention operate independently of the OS used, the need to develop and use a special purpose driver to implement the invention on different platforms is eliminated.

In accordance with an embodiment of the present invention, when a dial-up connection is initiated using a Remote Access Service (RAS) Application Programming Interface (API) call, the call goes through different connection states before establishing a PPP connection. The RAS enables a user to log on to a network via a dial-up connection and once logged on the user can operate as if the user were logged onto a computer which is physically attached to the network. In embodiments of the present invention it is contemplated that the application program can be implemented as a Windows® OS application or other windowing OS pseudo service, an OS extension or firmware application. The Windows® OS is licensed by Microsoft Corporation of Redmond, Wash.

At call initiation, in an embodiment of the present invention, the RAS notifies a callback function for each of the connect states and a Microsoft® Telephony Application Programming Interface (TAPI) monitor service is initiated simultaneously with a RAS call to monitor the line. TAPI is licensed by Microsoft Corporation of Redmond, Wash. TAPI is an architecture that provides simple and generic methods for making connections between two or more machines and accessing any media streams involved in that connection. In addition, TAPI can abstract call-control functionality from communication lines to allow different, and seemingly incompatible, communication protocols to expose a common interface to applications. TAPI enables the development of communications applications for operating systems that support the Microsoft® Win32® API, such as, for example, Microsoft® Windows®95 or Microsoft® Windows®2000 OSs. After receiving notice of the establishment of the physical link as a new call event, and before a PPP negotiation is initiated to make the PPP connection, the RAS callback function suspends the RAS operation. Similarly, the TAPI monitor service receives a NewCall event through the TAPI callback function after the physical connection is made. The TAPI service then extracts a communication handle for the communication line from the communication line data structures. The communication application then uses the communication handle to communicate with the communication line using the communication application's own proprietary protocols. The communication handle is passed to a serial object and used by the communication application to send and receive data over the communication line. After using the communication line, the communication application signals the RAS callback function to wake up. After receiving the wake up signal, the RAS call back function resumes the negotiation and makes the PPP connection. The communication application can now use the serial line for data transfers using one of the PPP supported protocols, for example, TCP/IP, and a Windows® OS socket implementation. A "socket" is generally a bi-directional "pipe," which is implemented in the Windows® OS as an application programming interface (API), and can be used to exchange data between networked computers. The Windows® OS Socket API is a networking API and consists of a set of calls which perform defined functions and pass information back and forth between the lower protocol layers. An application creates a socket when it specifies the IP address of an intended host, the type of service requested and the port that the particular application will use. Sockets can be identified within a host through the use of unique port numbers.

FIG. 1 illustrates a top-level functional diagram of an existing dial-up communication method which is used to communicate initially using a proprietary protocol over a communication line using a non-PPP connection, dropping the non-PPP connection and then attempting to communicating over the same communication line using a PPP connection. In FIG. 1, in block 105, a dial-up connection is requested using a communication application and a TAPI Dial (TAPIDial) API request to establish the connection. In block 110, a TAPI callback function receives notice of line events occurring on the requested communication line. In block 115 a check is made of each received line event to determine if the communication line is or has become available. If the answer to block 115 is NO, the communication line is not available, then the method returns to block 110 to wait for the next line event to be received by the TAPI callback function. If the answer in block 115 is YES, the communication line is available, then in block 120 the TAPI monitor service extracts the communication handle for the communication line from the communication line data structures. In block 125, the communication application uses the communication handle to communicate over the communication line using the communication application's own proprietary protocols. After the TAPI communication is completed, then, in block 130, the communication line is dropped. In block 135 the communication application initiates a dial-up connection using the RASDial API to connect to a called party. As the call is being set-up, numerous different connection states are encountered and as each connection state is encountered the RAS notifies the RAS Callback Function in block 140 of the ongoing line events. The TAPI callback function in block 110 is similarly notified of the ongoing line events. In block 145 a check is made to determine if a physical call connection has been established between the application and the called party. If the answer to block 145 is NO, that is, a physical call connection has not been established, then the method returns to block 140 to wait for the next line event to be received by the RAS callback function. If the answer in block 145 is YES, that is, a physical call connection has been established, then in block 150 the RAS callback function establishes the PPP connection over the communication line. In block 155, the communication application communicates over the communication line using TCP/IP and the Windows® OS socket implementation.

Figure 2:
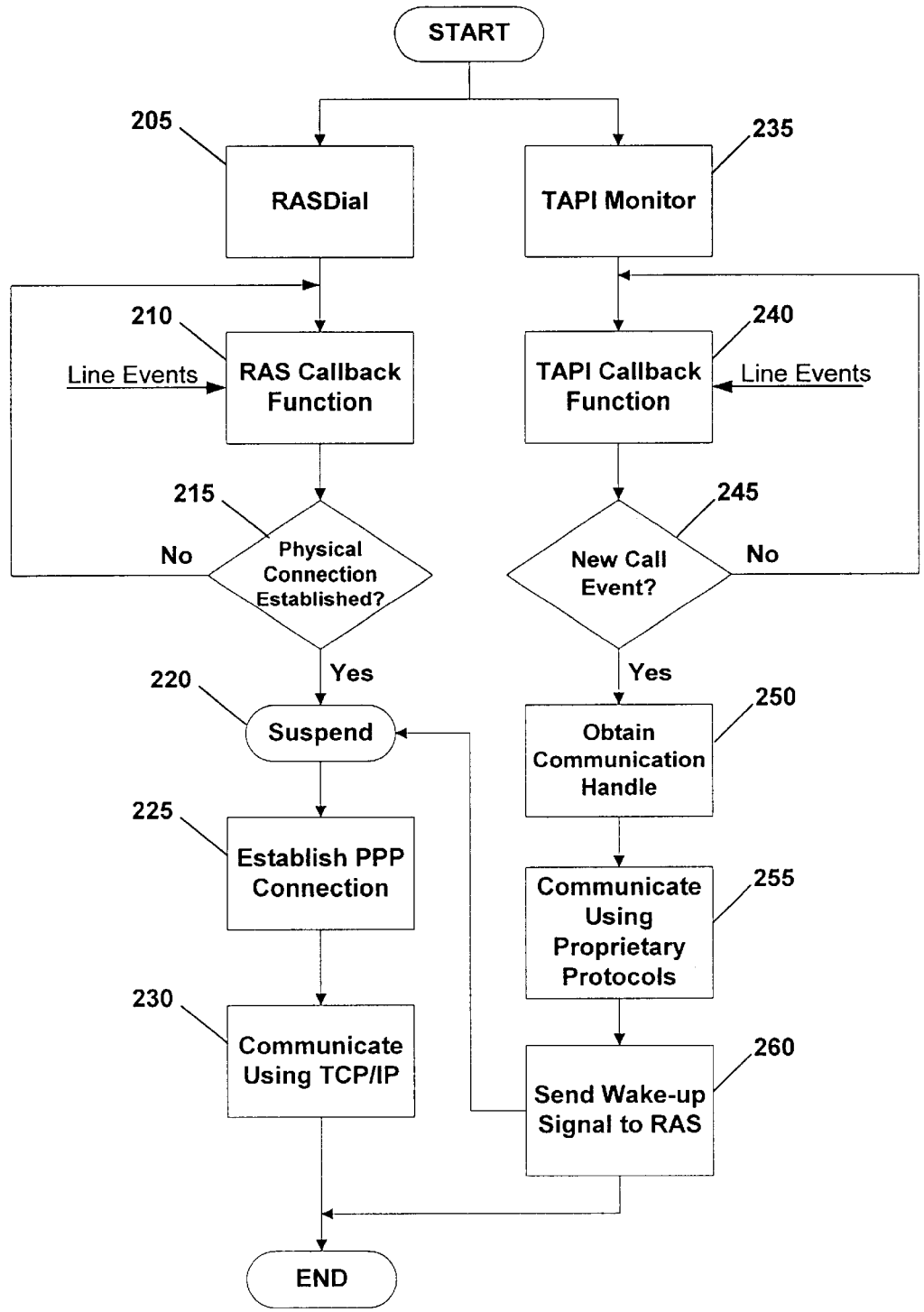
FIG. 2 illustrates a top-level functional diagram of an embodiment of the present invention in which a PPP connection is used to initially communicate with a proprietary protocol and then switch to TCP/IP without dropping the initial PPP connection.

In FIG. 2, in block 205 an application initiates a dial-up connection using a RAS Dial (RASDial) API to connect to a called party. As the call is being set-up, numerous different connection states are generally encountered and, in block 210, as each connection state is encountered a RAS Callback Function is notified of the ongoing line events. In block 215 a check is made to determine if one of the line event notifications identifies that a physical call connection has been established between the application and the called party. If the answer to block 215 is NO, that is, a physical call connection has not been established, then the method returns to block 210 to receive the next line event notification. If the answer in block 215 is YES, that is, a physical call connection has been established, then in block 220 the RAS callback function suspends the RAS operation before the PPP connection can be established.

In an embodiment of the present invention, simultaneously with block 205, in block 235 a TAPI monitor service can be initiated to monitor the line being used by the RASDial API to establish the call. In other embodiments of the present invention, initiating the TAPI monitor service in block 235 can also occur prior to block 205. In embodiments of the present invention, a TAPI callback function must be active in order to receive a NewCall line event which indicates that the physical connection has been made. As with the RASDial callback function, the TAPI callback function, in block 240, receives notice of line events occurring on the communication line. After the physical connection is made, the TAPI monitoring service receives the NewCall line event through the TAPI callback function in block 240. In block 245 a check is made to determine if the NewCall line event has been received by the TAPI callback function in block 240. If the answer to block 245 is NO, that is, the NewCall event connection has not been received, then the method returns to block 240 to wait for the next line event to be received by the TAPI callback function in block

240. If the answer in block 245 is YES, that is, the NewCall event connection has been received, then in block 250 the TAPI monitor service extracts the communication handle for the communication line from the communication line data structures. In block 255, the application uses the extracted communication handle to communicate over the line using the application's own proprietary protocols. After using the communication line, in block 260, the application sends a wake-up signal to the RAS callback function to wake-up the RAS operation which was suspended in block 220 and, then, the TAPI monitor service ends. In block 225, the RAS operation resumes and establishes the PPP connection. In an embodiment of the present invention, in block 230, the application can communicate over the communication line using TCP/IP and the Windows® OS socket implementation. In other embodiments of the present invention, the communication application can communicate over the communication line using the NetBEUI or IPX™–SPX™ protocols.

Figure 3:
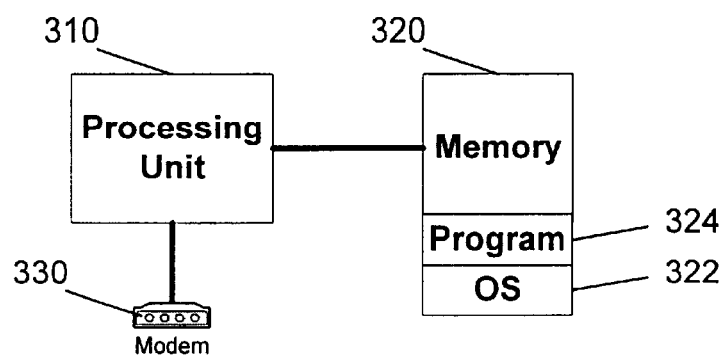
FIG. 3 illustrates a computer system on which embodiments of the present invention can be used.

FIG. 3 illustrates a computer system on which embodiments of the present invention can be used. In FIG. 3, a processor 310, such as an Intel® Pentium® class or above processor, is coupled to a main memory 320, and a modem 330. Pentium® processors are manufactured by Intel Corporation of Santa Clara, Calif. In accordance with an embodiment of the present invention, the main memory 320 is shown to contain an operating system 322 and an application program 324 which is enabled to communicate using both proprietary and TCP/IP protocols over a single PPP connection. In an embodiment of the present invention, the application program 324 can be stored on a mass storage device (not shown) including a floppy disk, a zip® disk, a CD, a DVD, a hard disk, a rewritable optical disk, flash memory or other non-volatile storage device and loaded into the main memory 320 when the computer system is booted up and the OS 322 (not shown) is also loaded into the main memory 320. Alternatively, the program 324 can be manually loaded by a user after the computer system is booted up. In another embodiment of the present invention, the application program can be stored in one or more memories or loaded into the computer via other media. The zip® disk is manufactured by Iomega Corporation of Roy, Utah. In an embodiment of the present invention, main memory 320 can include random access memory (RAM), Static RAM (SRAM), Dynamic RAM (DRAM), and Rambus® DRAM (RDRAM®). RDRAM® memory devices are manufactured by Rambus Inc. of Mountain View, Calif. In another embodiment of the present invention, the program can be integrated into the OS 322 as an OS service. In yet another embodiment the program can be implemented in firmware and embedded in a chip (not shown) which can be coupled to the processor 310.

In an embodiment of the present invention, a method and system enable multiple protocol communications over a single communication line using a point-to-point protocol (PPP) by first establishing a physical coupling to the single communication line using a PPP signaling function, then, suspending the PPP signaling function, receiving a notification of the physical coupling to the single communication line, and communicating over the single communication line using a first protocol. The method and system further include restarting the PPP signaling function and communicating over the single communication line using a second protocol.

It should, of course, be understood that while the present invention has been described mainly in terms of Win32-based Windows® OS-based computer systems, those skilled in the art will recognize that the principles of the invention may be used advantageously with alternative embodiments involving other OSs and computer systems. Accordingly, all such implementations which fall within the spirit and the broad scope of the appended claims will be embraced by the principles of the present invention.

What is claimed is:

1. A method comprising:
establishing a physical coupling to a single communication line using a point-to-point (PPP) signaling function;
suspending said PPP signaling function before a PPP connection is established;
receiving a notification of said physical coupling to said single communication line;
communicating over said single communication line using a first protocol;
restarting said PPP signaling function; and
communicating over said single communication line using a second protocol.

2. The method of claim 1, wherein establishing said physical coupling to said single communication line using a point-to-point (PPP) signaling function comprises:
transmitting an application dial-up communication coupling request using said PPP signaling function over said single communication line;
receiving notification of line events on said single communication line; and
coupling said application to said single communication line.

3. The method of claim 2, wherein said transmitting an application dial-up communication coupling request using said PPP signaling function over said single communication line, comprises:
initiating said dial-up communication coupling using a remote access service (RAS) signaling function application programming interface (API) call; and
receiving notification of line events which occur during the establishment of the physical coupling to said single communication line.

4. The method of claim 1, wherein said receiving a notification of said physical coupling to said single communication line comprises:
establishing a telephony applications programming interface (TAPI) monitor service; and
receiving a notification that said physical coupling to said single communication line has been established.

5. The method of claim 4, wherein said establishing a TAPI monitor service comprises:
establishing said TAPI monitor service simultaneously with said transmitting said dial-up communication coupling request.

6. The method of claim 4, wherein said TAPI monitor service is established to monitor said single communication line.

7. The method of claim 1, wherein said communicating over said single communication line using a first protocol comprises:
determining a communication handle of said physical coupling to said single communication line; and
communicating over said single communication line using said communication handle and said first protocol.

8. The method of claim 7, wherein said communicating over said single communication line using said communication handle and said first protocol, comprises:

communicating over said single communication line using said communication handle and a proprietary protocol.

9. The method of claim 1, wherein said communicating over said single communication line using a second protocol comprises:
   establishing a PPP communication link over said single communication line; and
   communicating using said second protocol over said single communication line.

10. The method of claim 9, wherein said second protocol is selected from the group comprising:
   a transmission control protocol/internet protocol, (TCP/IP);
   a network basic input/output system extended user interface (NetBEUI) protocol; and
   an internetwork packet exchange-sequenced packet exchange (IPX–SPX).

11. The method of claim 9, wherein said communicating over said single communication line using a second protocol further comprises:
   maintaining said physical coupling to said single communication line after communicating using said first protocol.

12. A computer-readable medium having stored thereon a plurality of executable instructions to perform a method comprising:
   establishing a physical coupling to a single communication line using a point-to-point (PPP) signaling function;
   suspending said PPP signaling function before a PPP connection is established;
   receiving a notification of said physical coupling to said single communication line;
   communicating over said single communication line using a first protocol;
   restarting said PPP signaling function; and
   communicating over said single communication line using a second protocol.

13. The computer-readable medium of claim 12, wherein said establishing a physical coupling to said single communication line using a point-to-point (PPP) signaling function comprises:
   transmitting an application dial-up communication coupling request using said PPP signaling function over said single communication line;
   receiving notification of line events on said single communication line; and
   coupling said application to said single communication line.

14. The computer-readable medium of claim 13, wherein said transmitting an application dial-up communication coupling request using said PPP signaling function over said single communication line, comprises:
   initiating said dial-up communication coupling using a remote access service (RAS) signaling function application programming interface (API) call; and
   receiving notification of line events which occur during the establishment of the physical coupling to said single communication line.

15. The computer-readable medium of claim 13, wherein said communicating over said single communication line using a first protocol comprises:
   determining a communication handle of said physical coupling to said single communication line; and
   communicating over said single communication line using said communication handle and said first protocol.

16. The computer-readable medium of claim 15, wherein said communicating over said single communication line using said communication handle and said first protocol, comprises:
   communicating over said single communication line using said communication handle and a proprietary protocol.

17. The computer-readable medium of claim 12, wherein said receiving a notification of said physical coupling to said single communication line comprises:
   establishing a telephony applications programming interface (TAPI) monitor service; and
   receiving a notification that said physical coupling to said single communication line has been established.

18. The computer-readable medium of claim 12, wherein said communicating over said single communication line using a second protocol comprises:
   establishing a PPP communication link over said single communication line; and
   communicating using said second protocol over said single communication line.

19. The computer-readable medium of claim 18, wherein said second protocol is selected from the group comprising:
   a transmission control protocol/internet protocol (TCP/IP);
   a network basic input/output system extended user interface (NetBEUI) protocol; and
   an internetwork packet exchange-sequenced packet exchange (IPX–SPX).

20. The computer-readable medium of claim 18, wherein said communicating over said single communication line using a second protocol further comprises:
   maintaining said physical coupling to said single communication line after communicating using said first protocol.

21. A computer system comprising:
   a processor unit;
   a memory unit coupled to said processor unit;
   an operating system (OS) stored in said memory unit; and
   a computer program stored in said memory unit to control said computer system to:
      establish a physical coupling to a single communication line using a point-to-point (PPP) signaling function;
      suspend said PPP signaling function before a PPP connection is established;
      receive a notification of said physical coupling to said single communication line;
      communicate over said single communication line using a first protocol;
      restart said PPP signaling function; and
      communicate over said single communication line using a second protocol.

22. The computer system of claim 21, wherein said establish a physical coupling to a single communication line using a point-to-point (PPP) signaling function comprises:
   transmit an application dial-up communication coupling request using said PPP signaling function over said single communication line;

receive notification of line events on said single communication line; and couple said application to said single communication line.

23. The computer system of claim 22, wherein said transmit an application dial-up communication coupling request using said PPP signaling function over said single communication line, comprises:

initiate said dial-up communication coupling using a remote access service (RAS) signaling function application programming interface (API) call; and receive notification of line events which occur during the establishment of the physical coupling to said single communication line.

24. The computer system of claim 21, wherein said receive a notification of said physical coupling to said single communication line comprises:

establish a telephony applications programming interface (TAPI) monitor service; and receive notification of line events on said single communication line.

25. The computer system of claim 21, wherein said communicate over said single communication line using a first protocol comprises:

determine a communication handle of said physical coupling to said single communication line; and communicate over said single communication line using said communication handle and said first protocol.

26. The computer system of claim 25, wherein said communicating over said single communication line using said communication handle and said first protocol, comprises:

communicate over said single communication line using said communication handle and a proprietary protocol.

27. The computer system of claim 21, wherein said communicating over said single communication line using a second protocol comprises:

establish a PPP communication link over said single communication line; and communicate using said second protocol over said single communication line.

28. The computer system of claim 27, wherein said second protocol is selected from the group comprising:

a transmission control protocol/internet protocol (TCP/IP);

a network basic input/output system extended user interface (NetBEUI) protocol; and an internetwork packet exchange-sequenced packet exchange (IPX–SPX).

29. The computer system of claim 27, wherein said communicating over said single communication line using a second protocol further comprises:

maintain said physical coupling to said single communication line after communicating using said first protocol.

* * * * *